United States Patent
Nian et al.

(10) Patent No.: US 7,464,140 B2
(45) Date of Patent: Dec. 9, 2008

(54) METHOD AND SYSTEM FOR DYNAMICALLY DETERMINING WEB RESOURCE TO BE LOADED AND SAVING SPACE

(75) Inventors: Yau-Wen Nian, Taipei (TW); Hsiao-Hui Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 981 days.

(21) Appl. No.: 10/841,629

(22) Filed: May 10, 2004

(65) Prior Publication Data

US 2005/0138140 A1    Jun. 23, 2005

(30) Foreign Application Priority Data

Dec. 4, 2003    (TW)    .............................. 92134250 A

(51) Int. Cl.
*H06F 15/16* (2006.01)
(52) U.S. Cl. ...................... 709/206; 209/217; 209/232; 370/229
(58) Field of Classification Search ................. 709/217, 709/232, 206; 370/229
See application file for complete search history.

(56) References Cited

U.S. PATENT DOCUMENTS

| | | | | |
|---|---|---|---|---|
| 6,119,167 A * | 9/2000 | Boyle et al. .................. 709/234 |
| 6,658,062 B1 * | 12/2003 | Nakatsuyama ............... 375/259 |
| 6,938,024 B1 * | 8/2005 | Horvitz ......................... 706/45 |
| 7,003,463 B1 * | 2/2006 | Maes et al. ............... 704/270.1 |
| 7,058,691 B1 * | 6/2006 | Yu et al. ..................... 709/207 |
| 7,092,946 B2 * | 8/2006 | Bodnar ......................... 707/10 |
| 7,111,076 B2 * | 9/2006 | Abjanic et al. ............... 709/246 |
| 7,240,104 B2 * | 7/2007 | Gautney ..................... 709/221 |
| 7,330,717 B2 * | 2/2008 | Gidron et al. ............... 455/418 |
| 2001/0054073 A1 * | 12/2001 | Ruppert et al. .............. 709/206 |
| 2003/0093520 A1 * | 5/2003 | Beesley ...................... 709/224 |
| 2004/0088373 A1 * | 5/2004 | Karukka et al. ............. 709/217 |
| 2004/0122949 A1 * | 6/2004 | Zmudzinski et al. ......... 709/225 |
| 2004/0181580 A1 * | 9/2004 | Baranshamaje ............. 709/206 |
| 2004/0236719 A1 * | 11/2004 | Horvitz ......................... 707/1 |
| 2005/0044242 A1 * | 2/2005 | Stevens et al. .............. 709/228 |
| 2005/0044260 A1 * | 2/2005 | Abramson et al. .......... 709/233 |
| 2005/0097503 A1 * | 5/2005 | Zintel et al. ................. 717/100 |
| 2005/0240940 A1 * | 10/2005 | Quinet et al. ............... 719/315 |
| 2006/0277257 A1 * | 12/2006 | Kromann et al. ............ 709/206 |
| 2007/0294343 A1 * | 12/2007 | Daswani et al. ............. 709/203 |

* cited by examiner

*Primary Examiner*—Alina N. Boutah
(74) *Attorney, Agent, or Firm*—Bacon & Thomas, PLLC

(57) ABSTRACT

A method for dynamically determining web resource to be loaded and saving space is provided which determines whether to download a network resource according to a current network bandwidth and available memory space. When a user uses an embedded device in a wireless network environment to download a web-page, the browser only downloads a small part of the network resource to present, and if the user desires to download all network resources, he or she can select to download all network resources, so as to save the download time.

11 Claims, 2 Drawing Sheets

METHOD AND SYSTEM FOR DYNAMICALLY DETERMINING WEB RESOURCE TO BE LOADED AND SAVING SPACE

BACKGROUND OF THE INVENTION

1. Field of the Invention

The present invention relates to a method for dynamically determining web resource to be loaded and saving space, and more particularly, to a method for dynamically determining web resource to be loaded and saving space for an embedded browser in a wireless networking environment.

2. Description of the Related Art

With the developments and improvements of computer and network technologies, embedded systems and wireless networking related electronic devices are becoming popular with people for use in their daily lives.

However, in a prior art embedded system and wireless networking environment, the network bandwidth is limited in comparison with the typical broadband environment, and thus the web-page downloading speed is slow. Furthermore, embedded systems do not have hardware resources that are as powerful as those provided in desktop computers, and this leads to inconvenience for the user.

The typical browser usually downloads all resources of a web-page as its hardware resource is powerful and the bandwidth is high. However, in the embedded system, since the bandwidth and hardware resources are insufficient, a user may only be able to download pure text files from the web-pages to avoid long delays or an excessive loading on memory, which not only ruins the original design of the web-page, but also waste browser resources and then reduces browser efficiency. Therefore, it is desirable to provide a method for dynamically determining web resource to be loaded and saving space for an embedded browser in a wireless networking environment to mitigate and/or obviate the aforementioned problems.

SUMMARY OF THE INVENTION

A main objective of the present invention is to provide a method for dynamically determining web resource to be loaded and saving space for an embedded browser in a wireless networking environment, which can increase the downloading speed for web-pages and keep original web-page layouts.

Another objective of the present invention is to provide a method for dynamically determining web resource to be loaded and saving space for an embedded browser in a wireless networking environment, which can change the web-page downloading speed according to available memory in the system to avoid discarding received web resources due to insufficient memory which results in wasting both network bandwidth and processing time.

According to one aspect of the present invention, a method for dynamically determining web resource to be loaded and saving space is provided, which comprises: (A) sending a request from a browser to link to a web-page; (B) analyzing the web-page to be linked to determine at least one network resource required by the web-page; (C) obtaining a content-length of the network resource from at least one server providing the network resource; and (D) downloading the network resource by browser if the network resource has a content-length smaller than a predetermined threshold.

According to another aspect of the present invention, a system for dynamically determining web resource to be loaded and saving space is provided, which comprises: at least one network server for providing at least one network resource required by a web-page; a browser core processing module for linking to a web-page; and a network resource management loading module for establishing a link to at least one corresponding network server according to a web-page required by the browser core processing module and obtaining a content-length of every network resource required by the web-page, and then providing the content-length of every network resource to the browser core processing module, wherein for every network resource, the browser core processing module determines whether to download the network resource according to its memory space and a network bandwidth.

DETAILED DESCRIPTION OF THE PREFERRED EMBODIMENT

Figure 1:
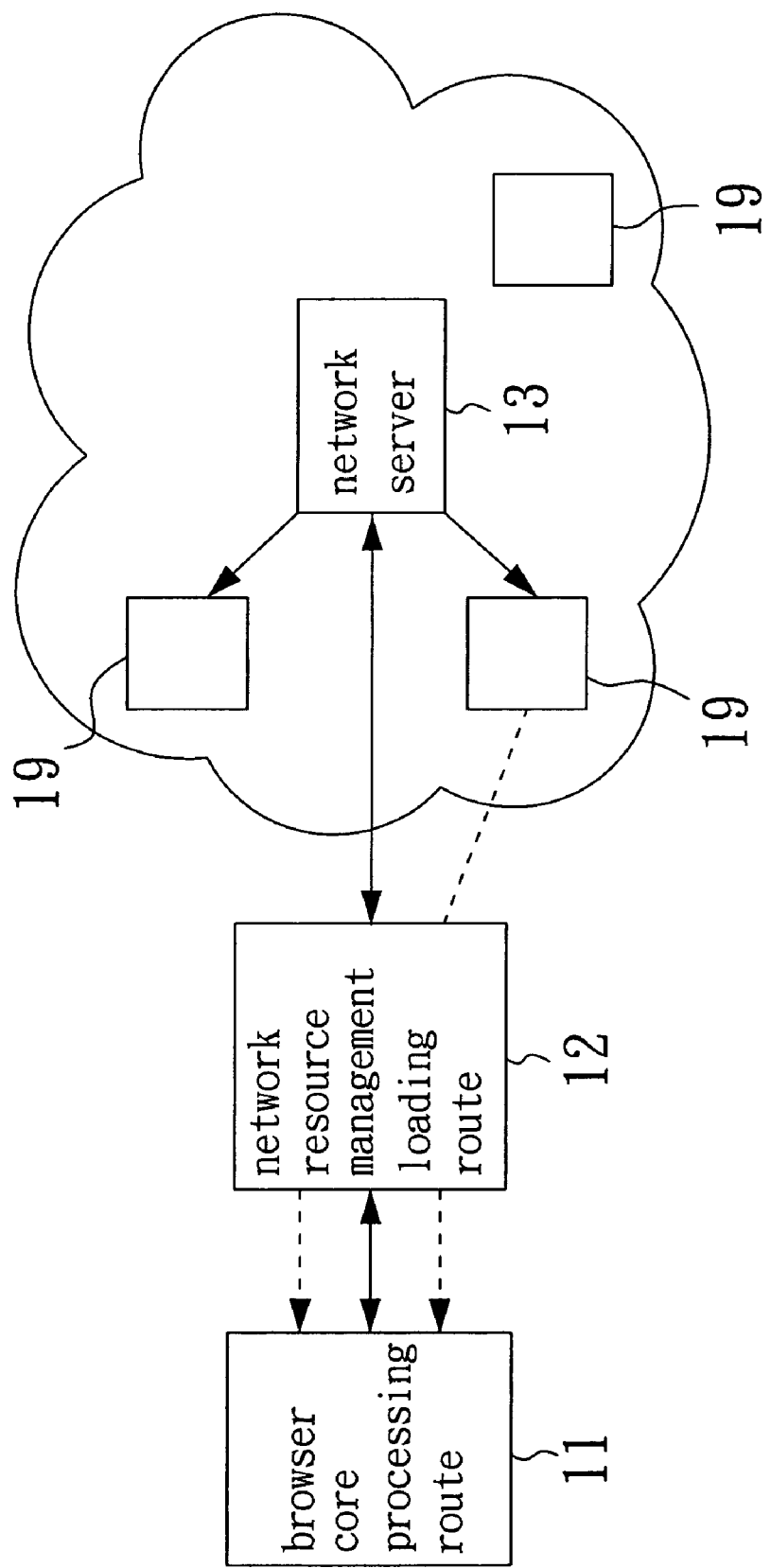
FIG. 1 is a system structure of an embodiment according to the present invention.

Please refer to FIG. 1. FIG. 1 is a system structure of an embodiment according to the present invention. In the present invention, the system comprises a browser core processing module 11, a network resource management loading module 12, and at least one network server 13. The browser core processing module 11 is used for linking to a web-page 19 on the Internet 10. The network server 13 is connected to the Internet 10, and is used for providing at least one network resource required by a web-page, such as an image file, a music file or a video file. The network resource management loading module 12 is used to manage the network resource downloaded by the browser core processing module 11.

Figure 2:
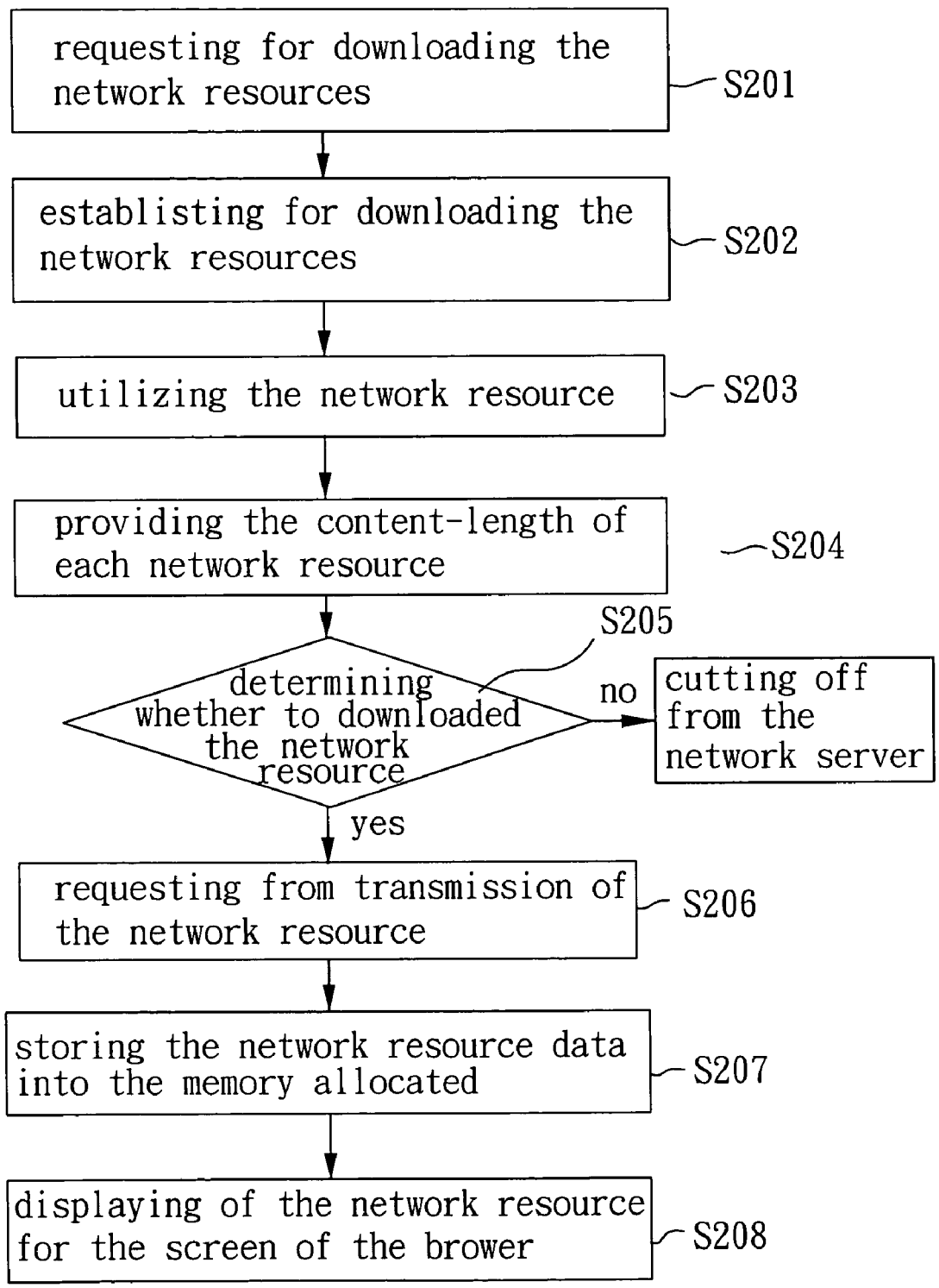
FIG. 2 is a flowchart of the embodiment according to the present invention.

Please refer to FIG. 2. FIG. 2 is a flowchart of the embodiment according to the present invention. Based upon the above-mentioned structure, in step 201, when the browser core processing module 11 links to a web-page, if the browser core processing module 11 needs to further download other network resources (such as GIF, JPEG or MPEG files) after processing the textual portion of the web-page, the browser core processing module 11 respectively requests the network resource management loading module 12 to download these network resources. In response, the network resource management loading module 12 respectively establishes a link to at least one corresponding network server 13 (step 202). In step 203, the network resource management loading module 12 can utilize an HTTP headercorresponding to the "HEAD" command of HTTP to obtain the type and content-length of the respective network resource from the network server 13. Afterwards, the network resource management loading module 12 notifies the browser core processing module 11 of the content-length of each network resource to be loaded (step 204).

In step 205, after obtaining the content-length of each network resource, the browser core processing module 11 determines whether to download the network resource by comparing the content-length of the network resource with a threshold. The network resource is downloaded only when the content-length of the network resource is smaller than the threshold. This threshold is determined by the available memory space of the browser system or the network bandwidth. Preferably, the threshold is a half the space of available memory. In this embodiment, when the current browser system has available memory space that is less than 10 Kb, and the network resource to be downloaded needs a larger memory space for decoding and displaying, such as GIF, JPEG or MPEG files, or if the content-length of the required resource is not recognized, the resource will not be downloaded, and instead a small icon is displayed on a position of the browser screen where the resource is designed to be displayed. This small icon indicates that the required resource will not be downloaded until the system has enough memory, whereupon a user can decide if he or she wants to download this network resource. Furthermore, the network resource management loading module 12 and the network server 13 are instructed to terminate the connection to avoid reprocessing this network resource. Alternatively or in addition to comparing the content length with a threshold, the browser core processing module 11 determines whether to download the network resource by comparing an estimated download time for downloading the network resource with time is another threshold. The estimated download time is determined by the current network bandwidth. Preferably, the estimated download time T is computed by $T=L*8/B*1000000$, where L is the content-length of the network resource, B is the current connection speed (Mbps), and the predetermined threshold is 30 seconds. If the download time exceeds 30 seconds, the network resource is not downloaded, and instead a small icon is displayed on a position of the browser screen where the resource is designed to be displayed. As aforementioned, this small icon indicates that the resource has not been downloaded, and the user can decide if he or she wants to download this network resource. Furthermore, the network resource management loading module 12 and the network server 13 are instructed to terminate the connection to avoid reprocessing of this network resource. After a network resource to be downloaded has been processed and been determined to be downloaded, the browser core processing module 11 allocates memory for the network resource, and provides the address of the allocated memory to the network resource management loading module 12 to enable downloading of the required network resource In step 206, the network resource management loading module 12 uses an "GET" command of HTTP to request from the connection established by the network server 13 to start transferring the network resource. In downloading network resources, preferably, the network resource management loading module 12 will first select a network server 13 having a relatively high number of network resources to be downloaded, and further first selects a network resource having a relatively fast decoding speed for transferring network resource, and the network resource having relatively small content-length is downloaded first.

In step 207, the network resource management loading module 12 directly stores the network resource data, sent from the network server 13, into the memory allocated by the browser core processing module 11. If the downloaded network resource is a graphical resource, the network resource management loading module 12 determines an appropriate size on the screen according to the received data. Please refer to the following Table 1, which shows how many bytes for different network resources are required to be received by the network resource management loading module 12 to determine the size of the network resource to be displayed on the screen (that is, determine the values and unit of coordinate X,Y on the screen for displaying the resource). After obtaining the size of the required network resource, the network resource management loading module 12 informs the browser core processing module 11 to allocate memory for the network resource, which reduces both memory waste and processing times.

TABLE 1

| Graphic type | values and unit of coordinate X, Y |
| --- | --- |
| BMP | having to receive 30 bytes to obtain the values and unit of coordinate X, Y for a graphics |
| WBMP | having to receive 4 bytes to obtain the values and unit of coordinate X, Y for a graphics |
| JPEG | having to receive 16 bytes to obtain the values and unit of coordinate X, Y for a graphics |
| GIF | having to receive 15 bytes to obtain the values and unit of coordinate X, Y for a graphics |
| PNG | having to receive 16 bytes to obtain the values and unit of coordinate X, Y for a graphics |

In step 208, when the network server 13 has finished data transmission for the resource, the network resource management loading module 12 informs the browser core processing module 11 to begin decoding and displaying of the network resource for the screen of the browser, using the data stored in the memory allocated for the network resource. Processing priority is based upon a decoding rate of the network resource. The browser first displays web-pages that have faster decoding rates.

Although the present invention has been explained in relation to its preferred embodiment, it is to be understood that many other possible modifications and variations can be made without departing from the spirit and scope of the invention as hereinafter claimed.

What is claimed is:

1. A method for dynamically determining web resource to be loaded and saving space, comprising:
   (A) sending a request from a browser to link to a web-page;
   (B) analyzing the web-page to be linked to determine at least one network resource required by the web-page;
   (C) obtaining a content-length of the network resource from at least one server providing the network resource, and comparing a download time of the network resource with a predetermined first threshold; and
   (D) downloading the network resource by the browser if the network resource has a content-length smaller than a predetermined second threshold determined by available memory space of the browser and a network bandwidth, wherein the predetermined second threshold is half the space of available memory, and the download time is smaller than the first predetermined threshold; otherwise, not downloading the network resource and displaying a small icon on a position of the browser where the network resource is designed to be displayed.

2. The method as claimed in claim 1, wherein in step (C), an HTTP "HEAD" command is used to obtain the content-length of the network resource.

3. The method as claimed in claim 2, wherein in step (C), an HTTP header corresponding to the "HEAD" command includes a content-length and a type of the network resource to be downloaded.

4. The method as claimed in claim 1, wherein in step (D), the downloaded network resource is sent to a predetermined memory location.

5. The method as claimed in claim 1, wherein in step (C), after obtaining the content-length of each network resource, the browser determines a size on a screen of the browser to display the network resource according to the content-length of each network resource.

6. A system for dynamically determining web resource to be loaded into an embedded device and saving space, comprising:

at least one network server for providing at least one network resource required by a web-page;

a browser core processing module included in the embedded device for linking to a web-page; and a network resource management loading module included in the embedded device for establishing a link to at least one corresponding network server according to a web-page required by the browser core processing module and obtaining a content-length of every network resource required by the web-page, and then providing the content-length of every network resource to the browser core processing module, wherein for every network resource, the browser core processing module determines whether to download the network resource according to its memory space and a network bandwidth;

wherein the network resource management loading module compares a download time of the network resource with a predetermined first threshold, and if the download time is smaller than the predetermined first threshold, the network resource is downloaded;

wherein for every network resource, the network resource management loading module compares the content-length of every network resource with a predetermined second threshold, wherein the predetermined second threshold is half the space of available memory, and when the content-length of the network resource is smaller than the predetermined threshold, the network resource is downloaded;

otherwise, the network resource is not downloaded and a small icon is displayed on a position of the browser core where the network resource is designed to be displayed.

7. The system as claimed in claim 6, wherein the network resource management loading module first selects a server having a relatively high number of network resources to be downloaded.

8. The system as claimed in claim 6, wherein if the required network resource has a content-length smaller than the predetermined threshold, the network resource is downloaded; otherwise the network resource is not downloaded.

9. The system as claimed in claim 6, wherein the download time of the network resource is:

$$T = L*8/B*1000000,$$

wherein T is an estimated download time, L is a content-length of the network resource, B is a current connection speed (Mbps), and the predetermined threshold is 30 seconds.

10. The system as claimed in claim 6, wherein a network resource having relatively small content-length is downloaded first.

11. The system as claimed in claim 6, wherein the network resource management loading module first downloads a network resource having a relatively fast decoding speed.

* * * * *